US012620286B2

(12) United States Patent
Bryl et al.

(10) Patent No.: US 12,620,286 B2
(45) Date of Patent: May 5, 2026

(54) SECURE DOCUMENT COLLECTION AND STORAGE CONTAINER

(71) Applicant: Xerox Corporation, Norwalk, CT (US)

(72) Inventors: Derek Bryl, Churchville, NY (US); David A. Vinke, Marion, NY (US); Kevin St. Martin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/767,742

(22) Filed: Jul. 9, 2024

(65) Prior Publication Data

US 2026/0018007 A1 Jan. 15, 2026

(51) Int. Cl.
*G07C 13/02* (2006.01)

(52) U.S. Cl.
CPC .................................... *G07C 13/02* (2013.01)

(58) Field of Classification Search
CPC .. G07C 13/02; A47G 29/1245; A47G 29/126; A47G 2029/146; B65D 33/34; B65D 5/4295; B65D 5/6655
USPC .............................................................. 232/2
See application file for complete search history.

(56) References Cited

U.S. PATENT DOCUMENTS 387,572 A 8/1888 Wood
478,283 A * 7/1892 Hodsdon ................ G07C 13/02 232/2
493,195 A * 3/1893 Stockstrom ............ G07C 13/02 232/2
674,404 A 5/1901 Gierding
742,783 A * 10/1903 Fox ........................ G07C 13/02 184/3.2
911,286 A * 2/1909 Beman ................... G07C 13/02 232/2
1,275,579 A * 8/1918 McGowan ............. G07C 13/02 232/2
1,277,811 A * 9/1918 Wyman .................. G07C 13/02 232/2
1,313,101 A * 8/1919 McNulty ................ G07C 13/02 232/2
1,524,498 A * 1/1925 Bartels ................... G07C 13/02 232/2
1,545,435 A * 7/1925 Mcfarland ............. G07C 13/02 190/111
1,673,769 A * 6/1928 Graham ................. G07C 13/02 220/6

(Continued)

FOREIGN PATENT DOCUMENTS

CA 1118734 A * 2/1982 ........... B65D 5/0263
CA 1145309 A * 4/1983 ........... B65D 5/3621

(Continued)

*Primary Examiner* — William L Miller
(74) *Attorney, Agent, or Firm* — Fox Rothschild LLP

(57) ABSTRACT

A secure document collection and storage container includes an opening positioned at or below a top edge of the front facet, and above a midpoint of the front facet. The opening is sized to receive ballots or test documents into the container. In some embodiments, a flap to cover the opening extends from a fold line of a segment of a top facet of the container. Facet edges that form the top seams and other seams of the container may include guide markings for guiding the placement of a sealing material. Also or alternatively, a sealing material may be placed over the guide markings.

28 Claims, 10 Drawing Sheets

(56) References Cited

U.S. PATENT DOCUMENTS

| | | | | | |
|---|---|---|---|---|---|
| 1,821,710 | A * | 9/1931 | Holbert | G07C 13/02 | 232/2 |
| 2,188,419 | A * | 1/1940 | Saviteer | E04H 13/003 | 70/164 |
| 2,437,584 | A * | 3/1948 | Zamora | G07C 13/02 | 232/44 |
| 2,777,633 | A | 1/1957 | Phillips | | |
| 3,211,366 | A * | 10/1965 | Draddy | G09F 1/00 | 232/2 |
| 3,827,624 | A * | 8/1974 | Dogliotti | B65D 5/6655 | 229/149 |
| 4,699,312 | A * | 10/1987 | Owen | A47F 5/112 | 248/459 |
| 4,981,259 | A | 1/1991 | Ahmann | | |
| 6,036,041 | A * | 3/2000 | Chern | G07C 13/02 | 220/6 |
| 6,648,144 | B2 | 11/2003 | Vogel | | |
| 7,395,956 | B1 | 7/2008 | Bell et al. | | |
| 8,038,053 | B2 | 10/2011 | Kapsis | | |
| 8,225,998 | B2 | 7/2012 | Bolton | | |
| 9,916,401 | B2 | 3/2018 | Eschbach et al. | | |
| 9,916,402 | B2 | 3/2018 | Eschbach et al. | | |
| 10,540,453 | B2 | 1/2020 | Eschbach et al. | | |
| 10,696,453 | B2 * | 6/2020 | Sena | A47G 29/141 | |
| 11,776,344 | B1 * | 10/2023 | Ogram | G07C 13/02 | 235/57 |
| 2001/0040422 | A1 * | 11/2001 | Gramlich | G07F 17/13 | 340/532 |
| 2001/0050306 | A1 | 12/2001 | Plumb | | |
| 2004/0173610 | A1 * | 9/2004 | Gregorio Gracia | B65D 11/1873 | 220/4.28 |
| 2007/0164033 | A1 * | 7/2007 | Maia | G07C 13/02 | 220/526 |
| 2008/0054059 | A1 * | 3/2008 | Chadima | B65D 5/685 | 229/102 |
| 2012/0211492 | A1 * | 8/2012 | Kelly | B65D 85/187 | 206/508 |
| 2016/0272362 | A1 * | 9/2016 | Grajales | B65D 5/4266 | |
| 2020/0323377 | A1 * | 10/2020 | O'Connor | A47G 29/20 | |
| 2021/0114775 | A1 * | 4/2021 | Tan | B65D 33/12 | |
| 2022/0257041 | A1 * | 8/2022 | Redford | A47G 29/141 | |
| 2025/0058926 | A1 * | 2/2025 | Hornstein | B65D 5/6655 | |
| 2025/0058930 | A1 * | 2/2025 | Kearns | B65D 5/4295 | |
| 2025/0182554 | A1 * | 6/2025 | Ellington | G07C 13/02 | |

FOREIGN PATENT DOCUMENTS

| | | | | |
|---|---|---|---|---|
| CA | 1226563 | A * | 9/1987 | G07C 13/02 |
| CN | 218068935 | U * | 12/2022 | |
| DE | 29913651 | U1 * | 12/1999 | G07C 13/02 |
| EP | 1332973 | A1 * | 8/2003 | B65D 5/4262 |
| FR | 2589269 | A1 * | 4/1987 | G07C 13/02 |
| GB | 2283964 | A * | 5/1995 | G07C 13/02 |
| GB | 2489287 | A * | 9/2012 | G07C 13/02 |
| JP | S59194972 | U * | 12/1984 | |
| JP | S59194973 | U * | 12/1984 | |
| JP | 3196936 | B1 * | 8/2001 | |
| KR | 900002805 | Y1 * | 4/1990 | G07C 13/02 |
| RU | 2169391 | C1 * | 6/2001 | |
| WO | WO-2012138712 | A1 * | 10/2012 | B65F 1/14 |

* cited by examiner

SECURE DOCUMENT COLLECTION AND STORAGE CONTAINER

BACKGROUND

In recent years, the need to ensure the security and integrity of certain documents such as voter ballots and test papers has become extremely important.

For example, in the case of voter ballots, the sanctity of the democratic process hinges upon the assurance that each vote is accurately recorded and counted. If the security or integrity of ballots is questioned, it can call the legitimacy of an election into question and erode public trust in the democratic process.

Thus, safeguarding the security and integrity of documents like voter ballots and test papers is essential for preserving the trust, fairness and legitimacy of democratic processes, educational systems and licensing administrators, among other entities.

This document describes items, methods and systems that are designed to address the issues described above.

SUMMARY

In a first embodiment, a secure document collection and storage container includes: (i) a first pair of opposing side facets comprising a front facet and a rear facet; (ii) a second pair of opposing side facets; (iii) a top facet comprising one or more facet segments, each of which is foldably connected to a corresponding one of the side facets, and which form a plurality of top seams when folded to a closed position; (iv) a bottom facet (108); and (v) an opening formed in the front facet. The opening is positioned at or below a top edge of the front facet, and above a midpoint of the front facet. Facet edges that form the top seams may include guide markings for guiding the placement of a sealing material.

In some embodiments, a secure document collection and storage container includes: (i) a first pair of opposing side facets comprising a front facet and a rear facet; (ii) a second pair of opposing side facets; (iii) a top facet comprising one or more facet segments, each of which is foldably connected to a corresponding one of the side facets, and which form a plurality of top seams when folded to a closed position; (iv) a bottom facet; and (v) an opening formed in the front facet. The opening is positioned at or below a top edge of the front facet, and above a midpoint of the front facet. The opening has a width that is at least as wide as the width of a document to be collected in the container, wherein the document comprises a ballot or a test answer sheet.

In some embodiments, a secure document collection and storage container includes: (a) a first pair of opposing side facets comprising a front facet and a rear facet; (b) a second pair of opposing side facets; (c) a top facet comprising at least a first facet segment that is foldably connected to the front facet along a fold line; (d) a bottom facet; (e) an opening formed in the front facet, wherein: (i) the opening has a width that is at least as wide as the width of a document to be collected in the container, wherein the document comprises a ballot or a test answer sheet, (iii) the opening is positioned at or below a top edge of the front facet, and above a midpoint of the front facet. In addition, a side flap extends from the first facet segment of the top facet, and the side flap is movable around the fold line from a first position that exposes the opening to a second position that covers the opening.

BRIEF DESCRIPTION OF THE DRAWINGS

FIG. 8A is a perspective view of an alternate embodiment of a container, while

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such as "first" and "second" are used to modify a noun, such use is simply intended to distinguish one item from another, and is not intended to require a sequential order unless specifically stated. The term "approximately" or "substantially" when used in connection with a numeric or measured value, is intended to include values that are close to, but not exactly, the value. For example, in some embodiments, the term "approximately" signifies values that are within +/−10 percent of a stated value.

When used in this document, terms such as "top" and "bottom," "upper" and "lower", or "front" and "rear," are not intended to have absolute orientations but are instead intended to describe relative positions of various components with respect to each other. For example, a first component may be a "front" or "top" component and a second component may be a "rear" or "bottom" component when a device of which the components are a part is oriented in a first direction. The relative orientations of the components may be reversed, or the components may be on the same plane, if the orientation of the structure that contains the components is changed. The claims are intended to include all orientations of a device containing such components.

Additional terms that are relevant to this disclosure will be defined at the end of this Detailed Description section.

Figure 1:
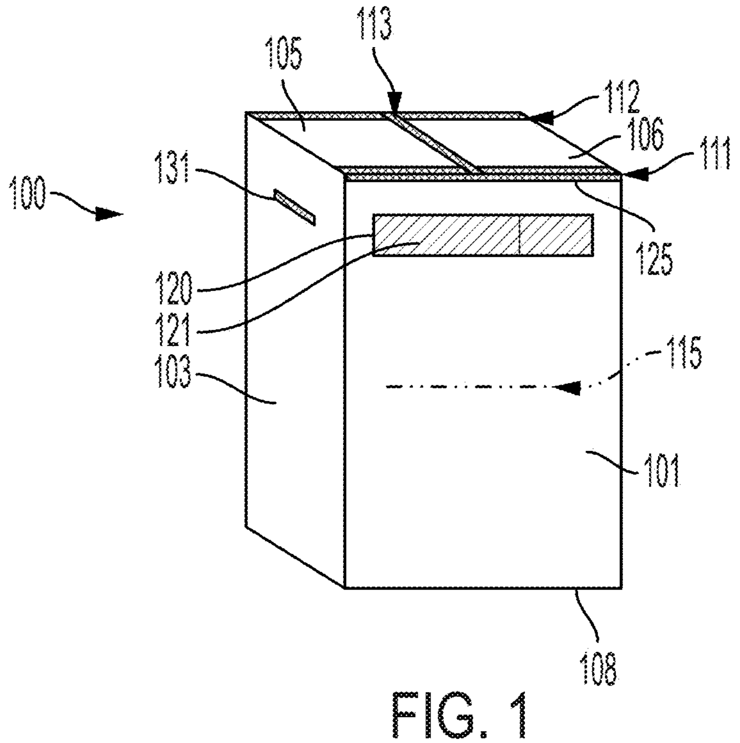
FIG. 1 illustrates a perspective view from a front side of a secure document collection and storage container.
Figure 2:
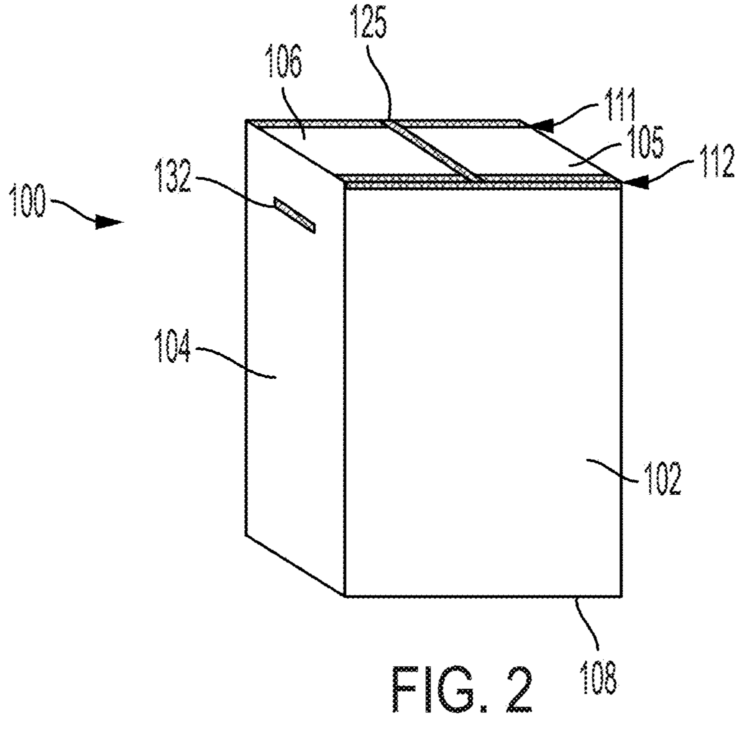
FIG. 2 illustrates a perspective view from a rear side of the secure document collection and storage container of FIG. 1.
Figure 3:
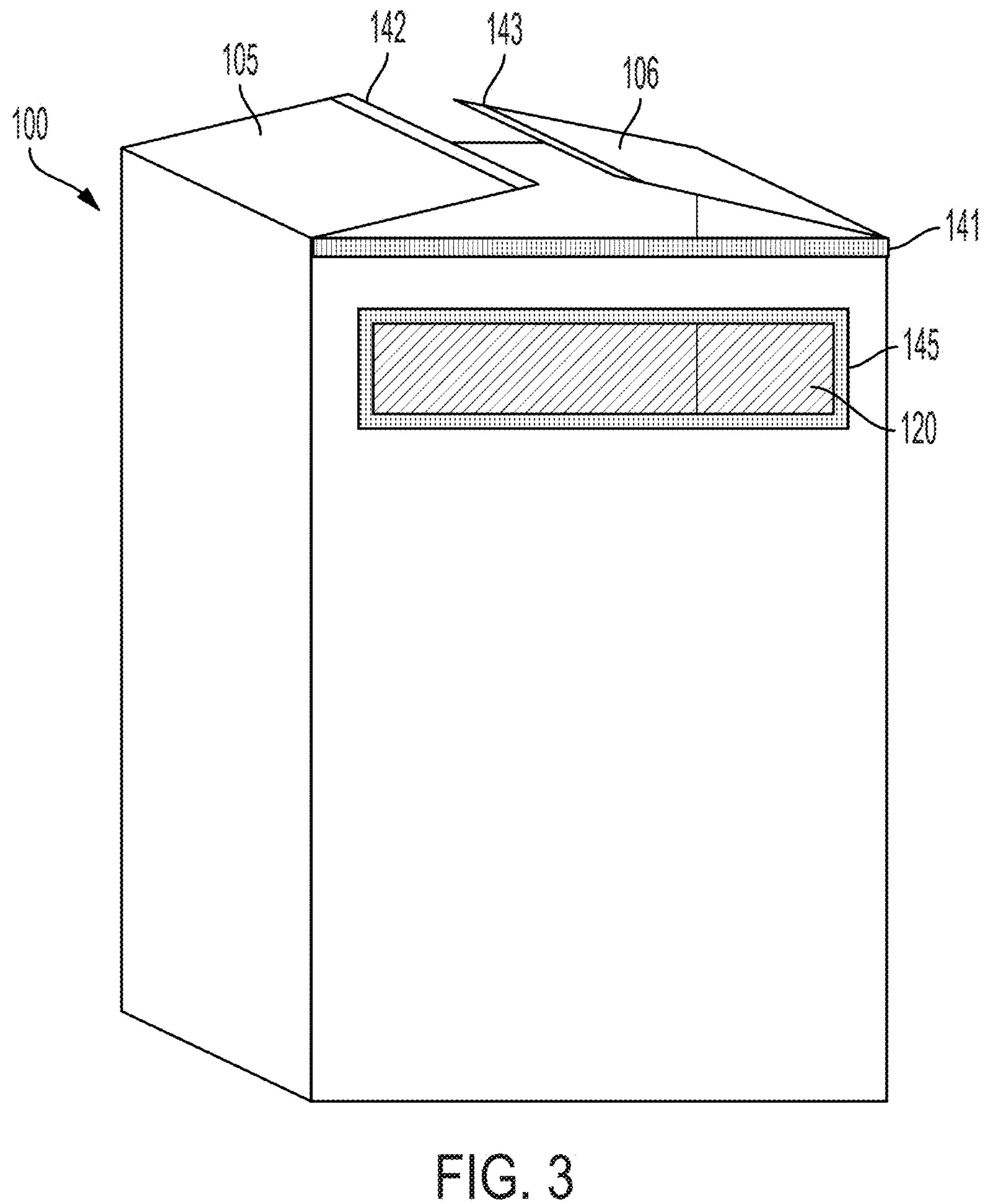
FIG. 3 illustrates the container of FIGS. 1-2 with its top opened and guide markings for sealing material placed in certain positions.

Various embodiments disclosed in this document use and/or include a secure document collection and storage container. The container can be used to secure documents for which the integrity needs to be maintained and secured, such as documents evidencing completed ballots or test answers. FIGS. 1-3 illustrate an example of one embodiment of such a container 100. In this case, the container 100 is in the form of a box having a first pair of opposing side facets 101 and 102 and a second pair of opposing side facets 103 and 104 that collectively form four sides of the box. The container 100 also includes a top facet comprising at least two facet segments 105 and 106. The container 100 also includes a bottom facet 108, which may be formed as a single facet or as multiple facet segments.

An opening 120 is formed in one of the side facets 101, For purposes of explanation, this discussion may refer to the side facet 101 that includes the opening 120 as the "front" side of the container, the opposite facet 102 as the "rear" site of the container, the top facet 105/106 as the "top" of the container, and the bottom facet 108 as the "bottom" of the container.

The top facet includes at least two facet segments 105 and 106, which in this illustration may be folded up and away from each other as shown in FIG. 3. Each top facet segment 105, 106 is rectangular and includes one edge that is foldably connected to a side facet 103, 104. In other words, each top facet segment 105, 106 connects to and is integral with a top edge of a side facet 103, 104 along a fold line. The other three edges of each top facet segment 105, 106 are not integral with the side facets 101, 102 but may be folded into a closed position and attached to the side facets 101, 102 by tape or other connecting material to form seams 111, 112 as described below. While the Figures show integration and fold lines as being between top facet segments 105, 106 and side facets 103, 104 by way of example, in other embodiments the integration and fold lines for top facet segments 105, 106 could instead be with front and rear side facets 101, 102, respectively.

An opening 120 is formed at or below the top edge of the front facet 101. The top edge of the front facet 101 is the location of the seam 111 between the front facet 101 and the top facet 105, 106 in the configuration shown. However, in embodiments where the front facet 101 is foldably connected to a top facet segment, the top edge of the front facet 101 will be the fold line between the front facet 101 and its integral top facet segment.

Figure 4:
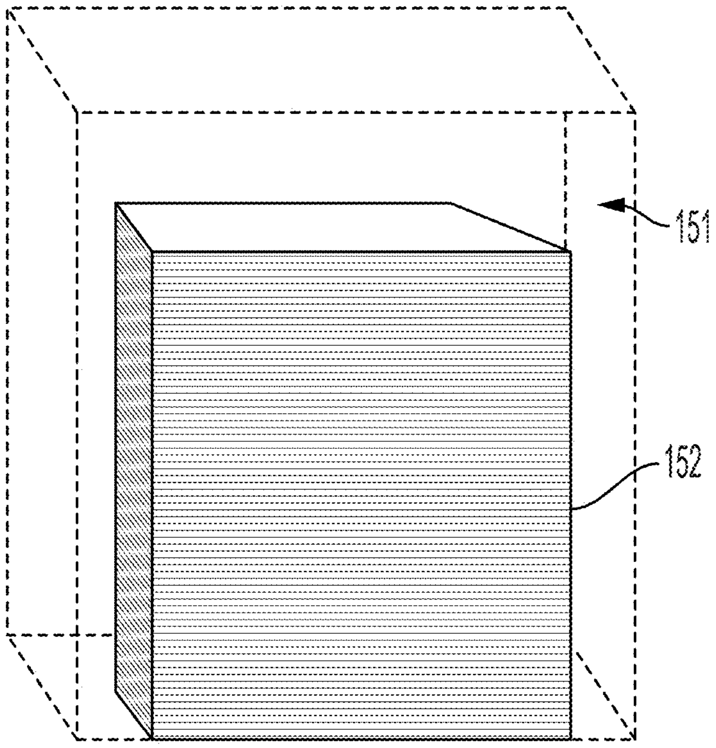
FIG. 4 illustrates a cut-away view of the container of FIG. 1, showing an interior chamber of the container with a stack of documents inside of it.

The opening 120 is also above the midpoint 115 of the front facet 101 so that the opening can receive documents into the container's interior chamber 151. The opening has a width that is at least as wide as the width of the document to be collected in the container, such as the width of a ballot or a test answer sheet. By positioning the opening 120 above the midpoint 115, a stack of documents can fill at least half of the chamber before the opening 120 will be blocked by the documents. Thus, it may be desirable to position the bottom boundary of the opening 120 closer to the top edge of the front facet 101 than to the midpoint 115. For example, the bottom boundary of the opening 120 may be located at a position away from the bottom facet 108 that is least 70%, at least 75%, at least 80%, or at least 85% of the height of the container 100. In this way, as shown in the cut-away view of FIG. 4, documents may be placed inside the container's chamber 151 to form a stack 152 that reaches more than half, and in some cases even more, of the height of the chamber.

The opening 120 is sufficiently sized to receive a document without a requirement to fold or otherwise modify the document, but the opening may be smaller than a typical adult human's hand and arm to prevent adults from reaching into the opening and removing documents from the chamber. For example, if the document is an 8-½ inch by 11 inch sheet of paper, the opening 120 may have (a) a width that is between approximately 8-⅝ inches and approximately 10 inches wide, such as a width that is approximately 9 to 9-½ inches, and (b) a length that is between approximately 11-⅛ inches and approximately 12-½ inches, such as a length that is approximately 11-½ to 12 inches. The opening 120 may have a height that is between approximately 1 inch and approximately 3 inches, such as a height of approximately 2 inches.

Figure 5:
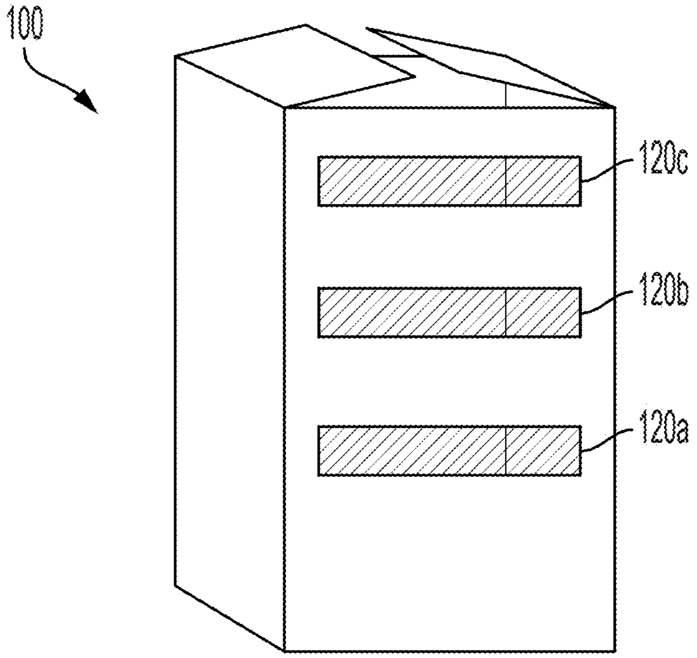
FIG. 5 illustrates an embodiment of a container in which the front facet includes multiple openings.
Figure 6:
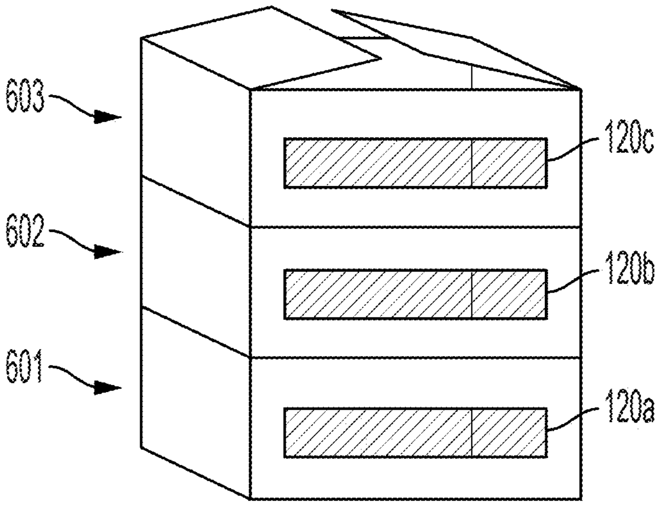
FIG. 6 illustrates an embodiment in which multiple containers are stacked on top of each other.

In the embodiment shown in FIGS. 1-3, container only has a single opening 120 for receiving documents, located on the front facet 101. However, optionally the rear facet 102 and/or one or more of the other side facets 103, 104, also may have a similarly-structured opening. In addition, in some embodiments as shown in FIG. 5, the front facet may include multiple openings 120*a*-120*c*, positioned at various heights. If so, then when filled documents will first be placed into first (lowest) opening 120*a* until the stack of documents in the container reach a height that is at or just below the bottom edge of first opening 120*a*. Documents will then be placed into the next-lowest opening 120*b*, and the process will continue until the highest opening (120*c*) is used. In addition, as illustrated in FIG. 6, in some embodiments a set of smaller, stacked containers 601-603 may collectively each include a respective front facet opening 120*a*, 120*b*, 120*c*. When a first container 120*a* is filled, a second container 120*b* may be placed on top of it and filled, followed by a third container 120*c*, and any number of additional containers.

The dimensions of each container 100 will include a length and width that are each slightly greater than the length and width of the documents that will be received into the chamber 151. For example, the length and/or width of the container may be any number in the range of from about 1% to about 25% greater than the corresponding width of the documents.

Figure 7A:
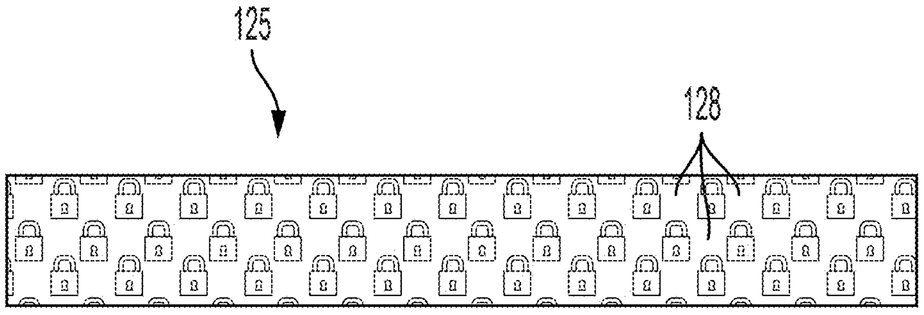
FIG. 7A illustrates an example security mark that may be printed onto the container, onto tamper-evident tape, or both.

Either before or after documents are received into the container, the top seams 111, 112, the seam 113 between the top facet segments 105, 106, and all other seams of the container 100 will be sealed shut with a sealing material 125. The sealing material 125 will also cover each opening 120 that is used to introduce documents into the container. Optionally, the sealing 125 may be in the form of tamper-evident tape. Tamper-evident tape is a type of security tape that cannot be removed or reapplied without leaving physical evidence, such as a visible message on the substrate of the container under the tape, or a visible change in security marks that are printed on or embedded in the tape. FIG. 7A illustrates an example strip of tamper-evident tape 125 with security marks 128. Any now or hereafter known tamper-evident tape materials may be used.

Figure 7B:
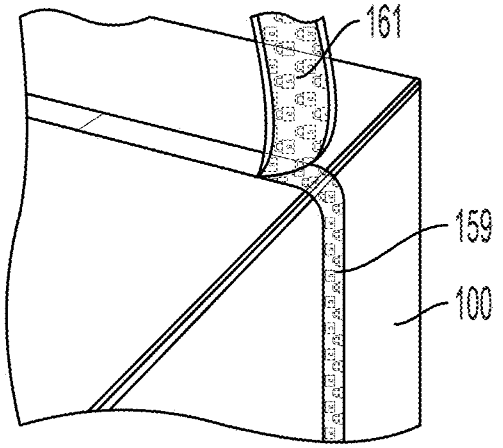
FIGS. 7B and 7C illustrate examples of tamper-evident tape that includes security marks.

For example, in some optional embodiments, as illustrated in FIG. 7B, the tamper-evident tape may be of the hidden message type in which the security marks are printed on a bottom adhesive layer 159 that adheres to the container 100. An opaque, removable covering layer 161 covers the adhesive layer 159 and shields the security marks from view unless and until the covering layer 161 is removed from the adhesive layer 159.

Figure 7C:
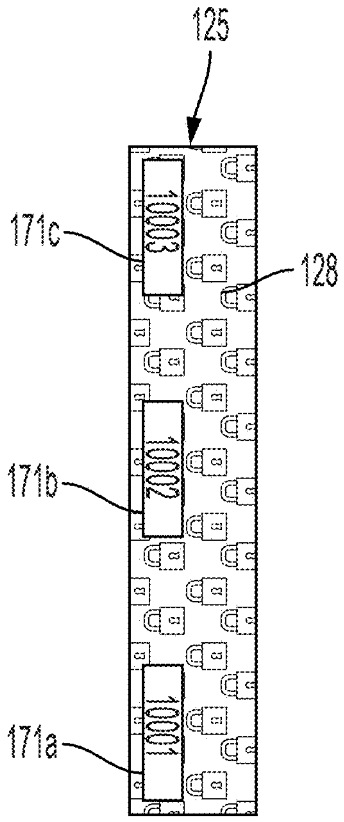

In addition, or alternatively, as illustrated in FIG. 7C, in some embodiments the security marks 128 are printed on a sealing material 125 that is tamper-evident tape. The tape may also (or alternatively) include additional security marks in the form of a sequence of unique serial numbers or other serialized codes 171*a* . . . 171*c*, printed on the tape at various intervals. If such tape is used, the tape applied to the container at the time the contents are secured will contain an uninterrupted sequence of codes. If, at a later time, it is determined that the codes printed on the tape do not follow an uninterrupted sequence, one may conclude that the original tape was removed and new tape was applied, thus providing evidence of tampering. For example, if an out-of-sequence code appears on the tape, or if a code of the sequence is missing from the tape, one may conclude that the container was compromised. The sequence may be a numeric sequence as shown in FIG. 7C. Alternatively, the sequence may be a sequence that is stored in a data set or other key as an ordered sequence, but which is appears to be random or is otherwise not in a typical numeric sequence when viewed by a human or optical reader that does not have access to the key.

In addition, as shown in FIG. 3 in which the top facets of the container are open and the container is not yet sealed closed, in some embodiments, security tape guide markings 141, 142, 143 may be printed on one or more of the facet edges of the container on the areas on which under the tamper-evident tape 125 will be placed. The security tape guide markings 141, 142, 143 will be positioned and have a width that matches (or is within 90% of) the width of the tape so that the tape completely covers the guide markings when the tape is correctly applied to the container. The security tape guide markings 141, 142, 143 may be positioned on the edges of facets that meet other edges to form the seams as shown. In addition, security tape guide markings 145 may be positioned around the border of other openings of the container (such as opening 120) to guide the placement of security tape, an adhesive label, or other marking around the other openings. The guide markings are marks printed on the facet with a pattern or color that is visibly distinct from the facet to serve as a base for receiving of the security tape. The guide markings may be in the form of a dot pattern, a line pattern, a color that is different from the color of the container, a pattern of icons or other images, and/or a combination of these and other markings. The guide markings are marks printed on the facet with a pattern or color that is visibly distinct from the facet to serve as a base for receiving of the security tape. The guide markings will have a border size and shape corresponding to that of the security tape such that when the tape is placed over the security marking, the tape will completely cover the full security marking, or the tape will completely cover all but a designated area of the security marking.

In some embodiments, none of the facets other than the front facet 101 include any opening when the seams are closed and covered by a sealing material. In other embodiments, as shown in FIGS. 1 and 2 handles 131, 132 are provided on opposing sides of the container. Optional handles 131, 132 will be openings that are sized to receive the fingertips of a human hand or the grip of a lifting device (such as robotic picker) and allow the human or a lifting device to lift and move the container. By way of example, handles 131, 132 may have a size of approximately 1 inch to approximately 2 inches high, and approximately 4 inches to approximately 5 inches wide. In FIGS. 1 and 2, handles 131, 132 are shown on the facets of the container that are not the front and back sides. However, in other embodiments, handles 131, 132 may be positioned on the front and back facets 101, 102. Optionally, when handles 131, 132 are positioned on the front and back facets 101, 102, a single opening 120 may serve the dual function of the handle and the document receiving slot. In other embodiments, the container may not include any handles.

In use, after documents have been placed into the box through the opening 120, the opening 120 and any other openings that are large enough to receive a human hand (such as handles 131, 132, if large enough to receive a full adult human hand) will be covered and sealed by a sealing material 121. Alternatively, handles 131, 132 may remain unsealed if they are sufficiently small to not allow a human or device to reach into the chamber and remove documents from, add documents to, or otherwise tamper with documents in the chamber. For example, any opening having a width dimension (in any direction) that is greater than 1 inch, 1.5 inches or 2 inches, or that is greater than 2.5 cm, 3 cm, 4 cm, or 5 cm may be covered by the sealing material.

The sealing material 121 that is used to seal the openings may be tamper-evident tape (such as that described above for sealing material 125) or any other type of tape or material that seals the opening and prevents access to the chamber. Alternatively, or in addition, the sealing material 121 may include a label with some unique identifying item with can used to identify the box and its contents, such as an adhesive label that has an attached or embedded a radio frequency identification (RFID) tag having a unique identifier, a label on which a human readable element (such as a barcode) is printed, or another identifier. The label may include an adhesive backing, or the label may be attached to a structure that includes an adhesive backing, such as a clear plastic sleeve. Alternatively or in addition, an RFID tag or human readable element may be included in or on a separate adhesive label that is attached to any facet of the container. Alternatively or in addition, an RFID tag may be directly embedded in a facet of the container, and/or a human readable element may be directly printed on a facet of the container. The identifier in the tag or label may be a unique code. Optionally, a system that uses the container may store the code in a data set in association with information about the container or its contents, such as the container's location, document IDs for documents in the chamber, a description of the contents of documents in the chamber, or images of the documents that are in the chamber. Alternatively or in addition, the sealing material 121 may be a covering that envelops the entire container, such as a plastic cling wrap or shrink wrap material.

The facets of the container 100 may be made of any material that is sturdy enough to hold the documents without breaking. Example materials include cardboard, plastic, wood or other fibrous material, and metal. In some embodiments, the container may be made of multiple different types of materials. If a very rigid material such as wood or metal is used, hinges may replace the fold lines described above.

Figure 8A:
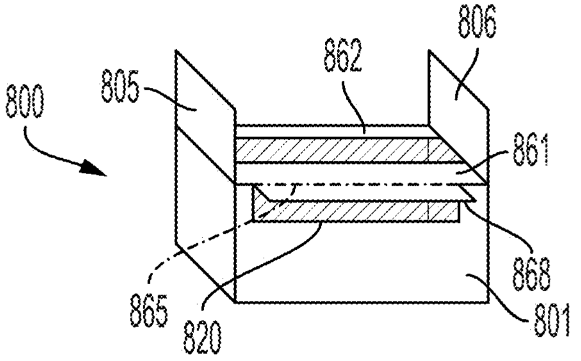
Figure 8B:
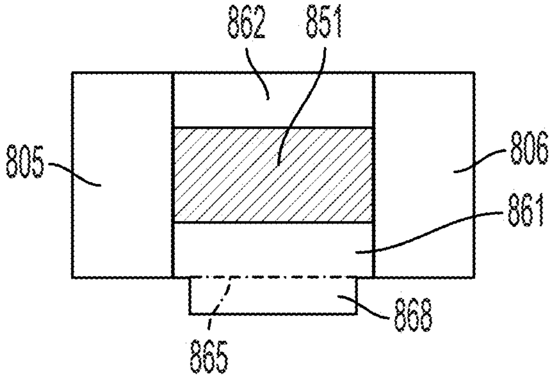
FIG. 8B is a top-down view of this embodiment.
Figure 8C:
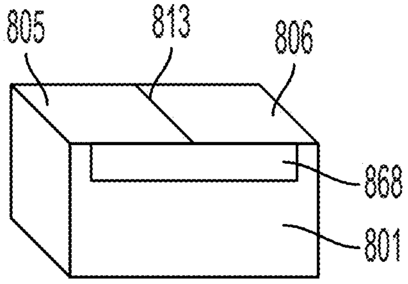
FIG. 8C shows this embodiment in which all flaps are closed.

FIGS. 1-3 and 5-6 illustrate embodiments in which the top facet includes two facet segments 105, 106. However, as noted above, in some embodiments the top facet may be made up of more than two facet segments. In addition, in some embodiments, the opening via which documents are received may be positioned as high on the side as possible, with the top border of the opening meeting and corresponding to the top of the container. FIG. 8A is a perspective view, and FIG. 8B is a top-down view, of an example embodiment of a container 800 in which this configuration may exist. The opening 820 leading to chamber 851 is positioned at the top of front facet 801 and is formed by three cut lines in the front facet 801 and the top of the front facet 801. Optionally, the front facet 801 may be formed of a single piece with a first top flap 861, meeting at fold line 865. Alternatively, the front facet 801 may be separated from the top flap 861 (see front facet 1301 and top facet 1362 in FIG. 13 for an example showing this alternate structure), and the side flap 868 will extend from first top flap 861 at fold line 865. The side flap 868 can be moved about the fold line between two positions. When the first top flap 861 is folded down as shown in FIG. 8A, side flap 868 will extend horizontally and reveal opening 820. FIGS. 8A and 8B show the container with the side flap 868 in an open position, which exposes opening 820, while FIG. 8C shows the container 800 in a closed position in which side flap 868 is folded down to align with the opening 820 on front facet 801 and cover the opening 820. The side flap 868 may have the same dimensions as opening 820 as shown in FIG. 8C. Alternatively, the side flap may be have a width dimension that is larger than a width dimension of the opening, a height dimension that is larger than a height dimension of the opening, or both, so that the edges of side flap contact and may be sealed against the front facet 801 when in a closed position (see side flap 1368 and opening 1320 in FIG. 12). In either case, the cut lines around the side flap 868 may then be sealed over and/or against to the front facet 801 using tamper evident tape or other sealing material as described in other embodiments.

The container 800 also may include a second top flap 862 that is integral with the rear side of the container. In some embodiments, when folded closed, as shown in FIG. 8C the front top flap 861 and second top flap 862 may meet at a seam and thus together provide the top facet. Alternatively, as shown in FIGS. 8A-8C, the front top flap 861 and second top flap 862 may be inner flaps, and the other two sides of the container may include integral top facet halves 805, 806 that may be folded down to meet at a seam 813 over the inner flaps.

Figure 9:
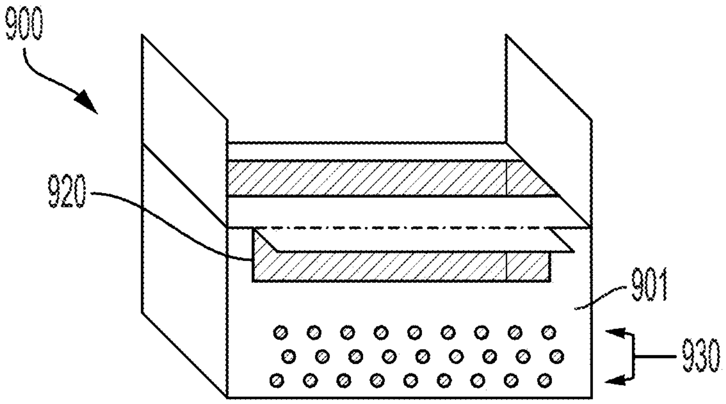
FIG. 9 illustrates an embodiment in which the container includes air holes to promote settling of documents within the container.

FIG. 9 illustrates an embodiment in which one of the side facets includes a matrix of small air holes 930 that help provide a path for air to escape when documents are placed in opening 920, thus helping to promote even settling of the documents within the container. The air holes 930 will be positioned below the opening 920, at least near the bottom of the container 900, and may be formed in any pattern or shape. The air holes 930 may be positioned in the front facet 901 as shown, or they may be positioned in any other side facet. When the container 900 is sealed closed, the air holes may be sealed with tamper-evident tape or other material. Or, if the air holes 930 are too small to allow documents to be accessed via the air holes, they may be allowed to remain open and unsealed. FIG. 9 illustrates the air holes in a container corresponding to the embodiment of FIGS. 8A-8C, but the air holes also may be used in any of the other embodiments, including but not limited to those shown in FIGS. 1-3, 5 and 6. The air holes 930 may be positioned in the front facet 901 as shown, or they may be positioned in any other side facet. When the container 900 is sealed closed, the air holes may be sealed with tamper-evident tape or other material. Or, if the air holes 930 are too small to allow documents to be accessed via the air holes, they may be allowed to remain open and unsealed. In addition, the container 900 may include any other features described in this document for other embodiments, such as guide markings positioned to guide the placement of tamper-evident tape or other sealing material, and other features.

Figure 10:
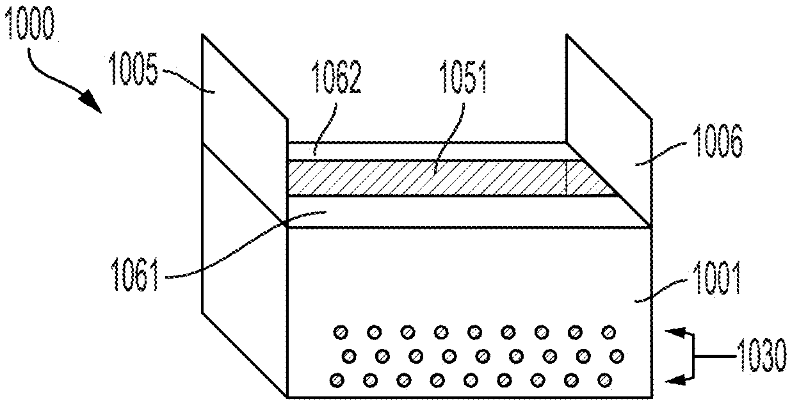
FIG. 10 illustrates another embodiment in which the container includes air holes to promote settling of documents within the container.

FIG. 10 also illustrates an embodiment in which one of the side facets 1001 includes a matrix of small exhaust holes 1030 that help provide a path for air to escape when documents are placed in container's chamber 1051, thus helping to promote even settling of the documents within the container. In use, a vacuum device may be positioned over the exhaust holes 1030 to suction air from the container and further promote settling of the documents in the chamber 1051. The exhaust holes 1030 will be positioned on a lower portion of the fact, such as the bottom half of the facet and optionally at or near the bottom of the container 1000, and may be formed in any pattern or shape. Unlike container 900 FIG. 9, container 1000 of FIG. 10 does not include an opening on the side for receiving documents. Instead, documents will be loaded into the chamber 1051 of container 1000 of FIG. 10 from the top, when the top facets 1005, 1006, 1061, 1062 are in an open position. Otherwise, container 1000 may include any of the other features that may apply to container 900 of FIG. 9.

Figure 11:
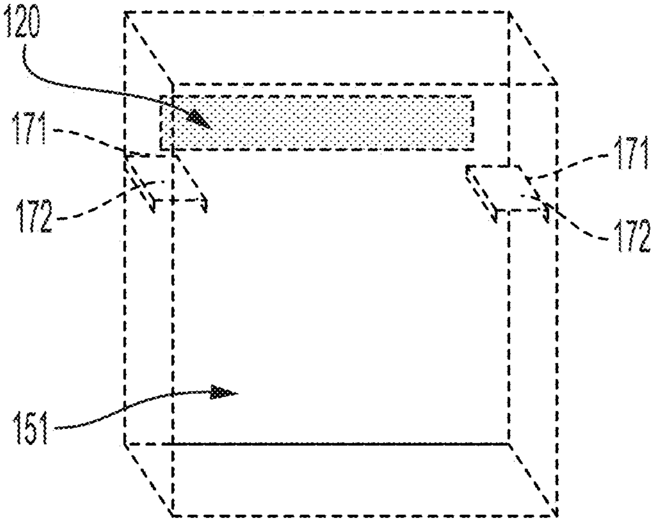
FIG. 11 illustrates optional structural features that may be included within the chamber of the container.

Referring to FIG. 11, in some options, the sidewalls of the chamber may include two or more guide rails 171. The guide rails 171 are sloped downward so that a first end of each rail is positioned at or just below the bottom edge of the opening 120, and the opposite end of each rail will be positioned lower than the first end, to provide a downward slope of from about 10 about to 45 degrees. The top surface 172 of each guide rail 171 will extend inward past the closest side boundary of the opening 120 so that when documents are received into the opening 120, the documents will contact the top surfaces 172 of the guide rails 171 and be guided forward and downward. The guide rails may extend inward from the front facet of the container to a distance that is from about 10% to about 50% of the width of the side facets, and thus facilitate formation of a stack of the documents within the container (as shown in stack 152 of FIG. 5) instead of having the documents fall straight down from the opening and crumple, roll or fold at the bottom of the chamber.

Figure 12:
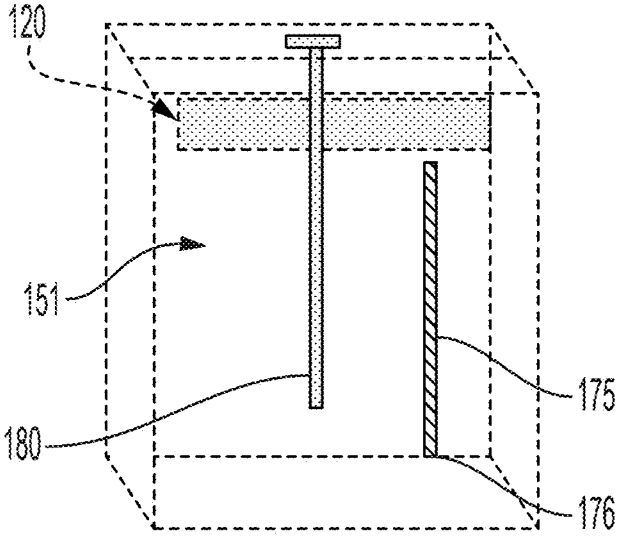
FIG. 12 illustrates other optional structural features that may be included within the chamber of the container.

Alternatively, as shown in FIG. 12 instead of or in addition to guide rails, a guide strip 180 may be positioned inside of the container, along or near the facet that is opposite to the facet that contains the opening 120. The guide strip 180 may be attached to a top facet 105 and extend downward from the top facet onto the chamber 151, or it may otherwise be positioned so that when papers are placed through opening 120 and into the chamber 151, the papers touch the guide strip 180 before the first edge of the document placed in the chamber begins to curl downward. In this way, the guide strip 180 will help the cause the central portion of the document to sink downward, with the edges of the document following the central area, to help the documents fall flat into the container rather than curling and becoming crumpled. The guide strip 180 may, but does not need to, extend from the top to the bottom of the container, but at a minimum it will be positioned in front of and at least partially below the height of the opening 120. The guide strip 180 will be made of a flexible material such as rubber, cloth or other soft fibrous material, or a flexible plastic such as HDPE.

Optionally, also as shown in FIG. 11, an anti-static strip 175 of material may be positioned against, and optionally attached to, the interior sidewall of the front facet. The anti-static strip 175 will extend from the bottom of the chamber 151 upward toward, and optionally beyond, the bottom of the opening 120. The anti-static strip will be made of a conductive grounding material that can dissipate static electricity that may form within the container when documents are placed inside of the chamber. For example, the anti-static strip may be made of HDPE. The anti-static strip 175 will be conductively connected to a grounding wire 176 that leads to an exterior of the container for connection to ground.

Before use, the container 110 may be formed and transported as a two-dimensional package flat in that includes crease lines and fold lines to guide formation of the three-dimensional container. Any facet edges that will form seams of the container may have security guide markings printed on them to guide the placement of a sealing material such as tamper-evident tape, other tape, adhesive labels, or other adhesive coverings.

Figure 13:
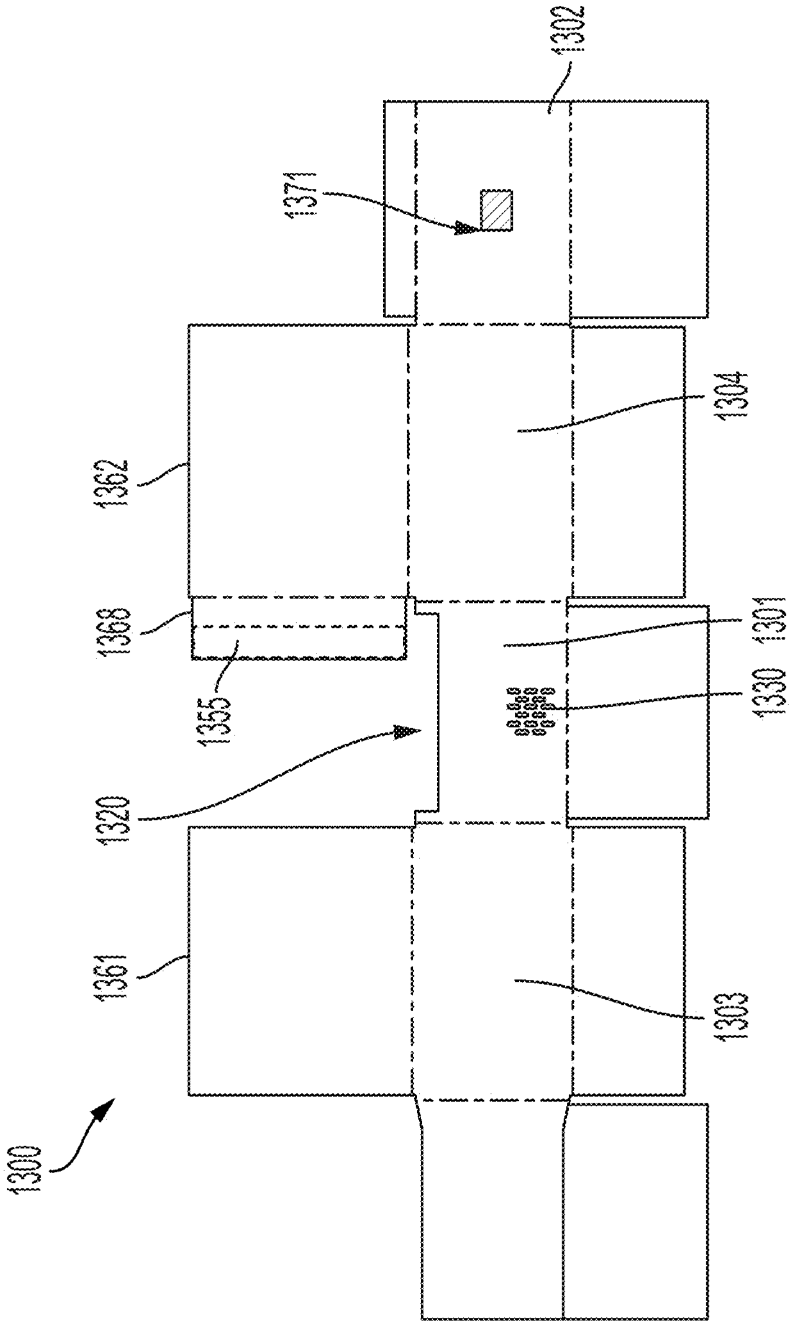
FIG. 13 illustrates an example package flat that can be used to form a secure document storage container.

FIG. 13 illustrates an example package flat 1300 that may be provided to form the container of various embodiments. The package flat 1300 is a flat substrate made of cardboard or other material, and in which the facets are formed by cut lines and fold lines. Cut lines are lines formed by cutting the substrate and are illustrated by solid lines in FIG. 13. Fold lines are creases formed by compressing the substrate and are illustrated by dashed lines in FIG. 13. In FIG. 13, front facet 1301 appears in a central area of the package flat and includes exhaust holes 1330 cut into the substrate material. The container's opening 1320 for receiving documents is formed by cut lines at the top of front facet 1301. The cut lines and the top edge of front facet 1301 serve as the boundaries of the opening 1320. Side facets 1303 and 1304 are foldably attached to front facet 1301 in that each side facet is attached to the front facet via a fold line. First top facet 1361 is foldably attached to a first side facet 1303, and second top facet 1362 is foldably attached to a second side facet 1304. In this embodiment, rather than forming a seam in the center of the top of the box when closed (as in seam 813 of FIG. 8C, when closed top facet segment 1362 will substantially completely cover top facet segment 1361, or vice versa, so that the seams are formed around the edges of the overlapping top facet segments. Also, in some embodiments, top facet segment 1361 may be omitted, so that the top facet is formed only from a single top facet segment 1362.

A side flap 1368 is foldably attached to and extends from the second top facet 1362. When the package flat is folded to form a container, the side flap 1368 will be foldably positioned to move between a position that covers the opening 1320 and a position that exposes the opening 1320 so that the opening can accept documents. (See similar elements side flap 868 and opening 820 in FIG. 8A, although in the embodiment of FIG. 13 the side flap 1368 has a width and/or height that is larger than that of the opening 1320).) Optionally, a sealing material 1355 such as double sided tape may be attached to the underside of side flap 1368 to aid in adhering and sealing the side flap 1368 to the front facet 1301 to cover the opening 1320 when the container is filled and sealed.

FIG. 13 also shows that one of the facets includes a label or tag 1371 attached to or embedded in the facet. The label or tag 1371 may be an RFID tag, an adhesive label, an adhesive label with an RFID tag attached to or embedded within it, or the like. Items that include RFID tags, such as customer replaceable units (CRUs) as are known to be used in print devices, may be employed in some embodiments, so long as the CRUs or their associated RFID chips include a unique identifier that cannot be modified when deployed. In FIG. 13 the label or tag 1371 is attached to rear facet 1302, but in other embodiments label or tag 1371 could be attached to any other facet. In addition, in various embodiments the label or tag 1371 could be attached to an exterior of a facet, attached to an interior of a facet, or attached to a facet by being embedded within it.

The features and functions described above, as well as alternatives, may be combined into many other different systems or applications. Various alternatives, modifications, variations or improvements may be made by those skilled in the art, each of which is also intended to be encompassed by the disclosed embodiments.

Without excluding further possible embodiments, certain example embodiments are summarized in the following clauses:

Clause 1: A secure document collection and storage container comprising: (i) a first pair of opposing side facets comprising a front facet and a rear facet; (ii) a second pair of opposing side facets; (iii) a top facet comprising one or more facet segments, each of which is foldably connected to a corresponding one of the side facets, and which form a plurality of top seams when folded to a closed position; (iv) a bottom facet (108); and (v) an opening formed in the front facet. The opening is positioned at or below a top edge of the front facet, and above a midpoint of the front facet. The opening has a width that is at least as wide as the width of documents to be collected in the container, wherein the documents comprise ballots or test answer sheets.

Clause 2: The container of clause 1, wherein the container further comprises a side flap that extends from one of the top facet segments at a fold line and that is movable around the fold line from a first position that exposes the opening to a second position covers the opening.

Clause 3:The container of clause 2, wherein: (a) the side flap has a width that is larger than a corresponding width of the opening, a height that is larger than a corresponding height of the opening, or both; and (b) the side flap further comprises a sealing material that is operable to secure the side flap to the front facet when the side flap is positioned to cover the opening Clause 4: The container of clause 1, 2 or 3, wherein facet edges that form the top seams and other seams of the container include guide markings for guiding the placement of a sealing material.

Clause 5: The container of clause 4 wherein, during use after the container is at least partially filled with documents, the top seams and any other seams of the container are sealed with the sealing material. Optionally, the opening also may be sealed by the sealing material.

Clause 6: The container of any of clauses 1-6, wherein none of the facets other than the front facet include any opening having a width dimension that is greater than 1 inch.

Clause 7: The container of any of clauses 4-6, further comprising the sealing material, and wherein the sealing material comprises a tamper-evident tape and the tamper-evident tape includes a plurality of security marks.

Clause 8: The container of clause 7, wherein the tamper-evident tape is placed over the guide markings, wherein each of the guide markings has a width that is substantially the same as a width of the tamper-evident tape so that the guide markings are completely covered by the tamper-evident tape.

Clause 9: The container of clause 7 or 8, wherein the security marks comprise a sequence of serialized codes.

Clause 10: The container of clause 7, 8, or 9, wherein the tamper-evident tape comprises an adhesive layer that is attached to the container and on which the security marks are printed and an opaque covering layer that is removably attached to the adhesive layer.

Clause 11: The container of any of clauses 1-10, wherein the side facets collectively form a chamber, documents are stackable within the chamber, the chamber has a length that is from about 1% to about 25% greater than a corresponding length of the documents, and the chamber has a width that is from about 1% to about 25% greater than a corresponding length of the documents.

Clause 12: The container of any of clauses 1-11, wherein the sealing material seals the opening and comprises tamper-evident tape or a label with a human readable security element.

Clause 13: The container of any of clauses 1-12, further comprising a radio frequency identification (RFID) tag having a unique identifier, wherein the RFID tag is attached to a facet of the container.

Clause 14: The container of any of clauses 1-13, wherein the side facets collectively form a chamber, the container includes one or more guide strips or guide rails within the chamber, and the one or more guide strips or guide rails are positioned to guide the documents when received into the opening to form a stack at the bottom of the chamber.

Clause 15: The container of any of clauses 1-14, further comprising a plurality of exhaust holes positioned on a lower half of at least one of the facets.

Clause 16: The container of any of clauses 1-15, wherein the opening is formed by a top edge of the front facet and three cut lines in the front facet.

Clause 17: A secure document collection and storage container comprising: (a) a first pair of opposing side facets comprising a front facet and a rear facet; (b) a second pair of opposing side facets; (c) a top facet comprising at least a first facet segment that is foldably connected to one of the side facets; (d) a bottom facet; and I an opening formed in the front facet, wherein: (i) the opening has a width that is at least as wide as the width of a document to be collected in the container, wherein the document comprises a ballot or a test answer sheet, (iii) the opening is positioned at or below a top edge of the front facet, and above a midpoint of the front facet. In addition, a side flap extends from the first facet segment of the top facet, and the side flap is movable around the fold line from a first position that exposes the opening to a second position that covers the opening.

Clause 18: The container of claim 17, further comprising any of the features described in any of clauses 3-16.

The invention claimed is:

1. A secure document collection and storage container comprising:

a first pair of opposing side facets comprising a front facet and a rear facet;

a second pair of opposing side facets;

a top facet comprising one or more top facet segments, each of which is foldably connected to a corresponding one of the side facets, and which form a plurality of top seams when folded to a closed position;

a bottom facet;

an opening formed in the front facet, wherein:

the opening has a width that is at least as wide as the width of documents to be collected in the container, wherein the documents comprise ballots or test answer sheets, and the opening is positioned at or below a top edge of the front facet, and above a midpoint of the front facet; and a side flap that extends from one of the top facet segments and that is movable around a fold line from a first position that exposes the opening to a second position that covers the opening.

2. The container of claim 1, wherein:

the side flap has a width that is larger than a corresponding width of the opening, a height that is larger than a corresponding height of the opening, or both; and the side flap further comprises a sealing material that is operable to secure the side flap to the front facet when the side flap is positioned to cover the opening.

3. The container of claim 1, wherein facet edges that form the top seams include guide markings for guiding placement of a sealing material.

4. The container of claim 3 wherein, during use after the container is at least partially filled with the documents:

the top seams of the container are sealed with the sealing material; and the opening is sealed by the sealing material.

5. The container of claim 3 further comprising the sealing material, and wherein:

the sealing material comprises a tamper-evident tape; and the tamper-evident tape includes a plurality of security marks.

6. The container of claim 5, wherein the tamper-evident tape is placed over the guide markings, wherein each of the guide markings has a width that is substantially the same as a width of the tamper-evident tape so that the guide markings are completely covered by the tamper-evident tape.

7. The container of claim 5, wherein the security marks comprise a sequence of serialized codes.

8. The container of claim 5, wherein the tamper-evident tape comprises:

an adhesive layer that is attached to the container and on which the security marks are printed; and an opaque covering layer that is removably attached to the adhesive layer.

9. The container of claim 1, wherein none of the facets other than the front facet include any opening having a width dimension that is greater than 1 inch.

10. The container of claim 1, wherein:

the side facets collectively form a chamber;

the documents are stackable within the chamber;

the chamber has a length that is from about 1% to about 25% greater than a corresponding length of the documents; and the chamber has a width that is from about 1% to about 25% greater than a corresponding width of the documents.

11. The container of claim 1, wherein a sealing material seals the opening and comprises:

a label with a human readable security element; or tamper-evident tape.

12. The container of claim 1, further comprising a radio frequency identification (RFID) tag having a unique identifier, wherein the RFID tag is attached to one of the facets of the container.

13. The container of claim 1, wherein:

the side facets collectively form a chamber; and the container includes one or more guide strips or guide rails within the chamber, wherein the one or more guide strips or guide rails are positioned to guide the documents when received into the opening to form a stack at the bottom of the chamber.

14. The container of claim 1, further comprising a plurality of exhaust holes positioned on a lower half of at least one of the facets.

15. The container of claim 1, wherein the opening is formed by the top edge of the front facet and three cut lines in the front facet.

16. A secure document collection and storage container comprising:

a first pair of opposing side facets comprising a front facet and a rear facet;

a second pair of opposing side facets;

a top facet comprising at least a first facet segment that is foldably connected to one of the side facets;

a bottom facet;

an opening formed in the front facet, wherein:

the opening has a width that is at least as wide as the width of documents to be collected in the container, wherein each of the documents comprises a ballot or a test answer sheet, and the opening is positioned at or below a top edge of the front facet, and above a midpoint of the front facet; and a side flap that extends from the first facet segment of the top facet, and which is movable around a fold line from a first position that exposes the opening to a second position that covers the opening.

17. The container of claim 16, wherein:

the side facets collectively form a chamber;

the documents are stackable within the chamber;

the chamber has a length that is from about 1% to about 25% greater than a corresponding length of the documents; and the chamber has a width that is from about 1% to about 25% greater than a corresponding length of the documents.

18. The container of claim 16 wherein, the top facet is foldable to a closed position that forms a plurality of seams; and during use after the container is at least partially filled with the documents, the seams are sealed with tamper-evident tape.

19. The container of claim 16, further comprising a plurality of exhaust holes positioned on a lower half of at least one of the facets.

20. A secure document collection and storage container comprising:

a first pair of opposing side facets comprising a front facet and a rear facet;

a second pair of opposing side facets;

a top facet comprising one or more top facet segments, each of which is foldably connected to a corresponding one of the side facets, and which form a plurality of top seams when folded to a closed position;

a bottom facet;

an opening formed in the front facet, wherein:

the opening has a width that is at least as wide as the width of documents to be collected in the container, wherein the documents comprise ballots or test answer sheets, and the opening is positioned at or below a top edge of the front facet, and above a midpoint of the front facet; and a sealing material, wherein:

facet edges that form the top seams include guide markings for guiding placement of the sealing material, the sealing material comprises a tamper-evident tape, the tamper-evident tape includes a plurality of security marks, the tamper-evident tape is placed over the guide markings, and each of the guide markings has a width that is substantially the same as a width of the tamper-evident tape so that the guide markings are completely covered by the tamper-evident tape.

21. The container of claim 20, wherein none of the facets other than the front facet include any opening having a width dimension that is greater than 1 inch.

22. The container of claim 20, wherein the security marks comprise a sequence of serialized codes.

23. The container of claim 20, wherein the tamper-evident tape comprises:

an adhesive layer that is attached to the container and on which the security marks are printed; and an opaque covering layer that is removably attached to the adhesive layer.

24. The container of claim 20, wherein:

the side facets collectively form a chamber;

the documents are stackable within the chamber;

the chamber has a length that is from about 1% to about 25% greater than a corresponding length of the documents; and the chamber has a width that is from about 1% to about 25% greater than a corresponding width of the documents.

25. The container of claim 20, further comprising a radio frequency identification (RFID) tag having a unique identifier, wherein the RFID tag is attached to one of the facets of the container.

26. The container of claim 20, wherein:

the side facets collectively form a chamber; and the container includes one or more guide strips or guide rails within the chamber, wherein the one or more guide strips or guide rails are positioned to guide the documents when received into the opening to form a stack at the bottom of the chamber.

27. The container of claim 20, further comprising a plurality of exhaust holes positioned on a lower half of at least one of the facets.

28. The container of claim 20, wherein the opening is formed by the top edge of the front facet and three cut lines in the front facet.

* * * * *